United States Patent
Qi et al.

(10) Patent No.: US 8,057,767 B1
(45) Date of Patent: Nov. 15, 2011

(54) BASE METAL OXIDES OXIDATION CATALYST

(75) Inventors: Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/853,357

(22) Filed: Aug. 10, 2010

(51) Int. Cl.
*B01D 53/56* (2006.01)
*B01D 53/94* (2006.01)

(52) U.S. Cl. .............. 423/213.2; 423/213.5; 423/239.1; 423/245.3; 423/247; 60/299

(58) Field of Classification Search .............. 423/213.2, 423/213.5, 239.1, 245.3, 247; 60/299
See application file for complete search history.

(56) References Cited

U.S. PATENT DOCUMENTS

| | | | |
|---|---|---|---|
| 4,003,976 A * | 1/1977 | Komatsu et al. | 423/213.5 |
| 6,103,207 A * | 8/2000 | Chattha et al. | 423/213.2 |
| 6,548,032 B1 * | 4/2003 | Barthe et al. | 423/213.2 |
| 6,680,036 B1 * | 1/2004 | Fisher et al. | 423/213.2 |
| 7,413,720 B2 * | 8/2008 | Ott | 423/239.1 |
| 2002/0016259 A1 * | 2/2002 | Yoshikawa | 502/324 |
| 2009/0285736 A1 * | 11/2009 | Schafer-Sindlinger et al. | 423/213.5 |

* cited by examiner

*Primary Examiner* — Timothy Vanoy
(74) *Attorney, Agent, or Firm* — Reising Ethington P.C.

(57) ABSTRACT

Chemical species such as nitrogen oxide (NO), carbon monoxide, and low molecular weight hydrocarbons (e.g., $C_1$-$C_5$ and saturated or ethylenically unsaturated) in an oxygen-containing gas stream, such as the exhaust stream from a diesel engine, or other lean burn engine, may be oxidized using a mixture of MnOx with one or more other base metal oxides, with or without palladium. The oxidation is effective at temperatures above about 200° C. to convert about ninety percent or more of the carbon monoxide to carbon dioxide and to consume the hydrocarbons. The oxidation is also effective to convert much of the NO to $NO_2$. In general, the mixed base metal oxides may be used as catalysts for the oxidation of nitrogen oxide in hot gas streams containing oxygen. They may optionally be used in a combination with palladium or platinum. But platinum, which is very expensive, does not have to be used in such oxidation reactions.

20 Claims, 3 Drawing Sheets

BASE METAL OXIDES OXIDATION CATALYST

TECHNICAL FIELD

This disclosure pertains to the catalyzed oxidation of carbon monoxide, nitrogen oxide (NO), and incompletely burned hydrocarbons (HC) in the exhaust of a diesel engine or other lean burn engine, or in other oxygen-containing gas mixtures. More specifically, this invention pertains to the use of MnOx in combination with other suitable metal oxides for catalysis of such oxidation reactions. Further, suitable combinations of MnOx with other base metal oxides may be used to oxidize NO in many oxygen-containing gas mixtures. And these combinations of base metal oxides may be combined with supported particles of palladium and/or platinum for such oxidation reactions.

BACKGROUND OF THE INVENTION

Diesel engines, some gasoline fueled engines, and many hydrocarbon fueled power plants are operated at higher than stoichiometric air-to-fuel mass ratios for improved fuel economy. Such lean-burning engines and other power sources, however, produce a hot gaseous exhaust with relatively high contents of oxygen, water, and nitrogen oxides (mostly NO and $NO_2$, collectively, $NO_x$). In the case of diesel engines, the temperature of the exhaust gas from a warmed up engine is typically in the range of about 200 degrees to 400 degrees Celsius, and has a representative composition, by volume, of about 10% oxygen, 6% carbon dioxide, 0.1% carbon monoxide (CO), 180 ppm hydrocarbons (HC), 235 ppm $NO_x$ and the balance substantially nitrogen and water. The exhaust gas often contains some very small carbon-rich particles. And to the extent that the hydrocarbon fuel contains sulfur, the exhaust from the combustion source may also contain sulfur dioxide. It is desired to treat such exhaust gas compositions to minimize the discharge of any substance to the atmosphere other than nitrogen, carbon dioxide, and water.

The $NO_x$ gases, typically comprising varying mixtures of nitrogen oxide (NO) and nitrogen dioxide ($NO_2$), are difficult to reduce to nitrogen ($N_2$) because of the oxygen ($O_2$) content (and water content) in the hot exhaust stream. It is found that when much of the NO is oxidized to $NO_2$, there are selective catalytic reduction additives and reaction methods for reducing much of the $NO_2$ to nitrogen in the hot exhaust. But the effective and timely oxidation of NO (and CO and HC) in the exhaust has required the use of platinum as a catalyst. There is a need for a much less-expensive catalyst material for such oxidation reactions, whether in a combustion exhaust steam or in another gaseous environment.

SUMMARY OF THE INVENTION

It is found that mixtures of manganese oxide (MnOx) with one or more other suitable base-metal oxides may be prepared for the effective oxidation of CO, HC, and NO in the oxygen-rich exhaust of a diesel engine, other lean-burn engine, or other hydrocarbon-fueled combustion device. And such manganese oxide containing mixtures may be used as effective catalysts in the oxidation of other gaseous mixtures comprising one or more of nitrogen oxide (NO), HC (typically $C_1$-$C_5$ hydrocarbons, saturated and unsaturated), and CO in combination with oxygen or oxygen and water.

Manganese is observed to exhibit several possible oxidation states in its oxides (e.g., +2, +3, and +4) depending on the gaseous environment in which it is employed. Two or more such manganese oxides may exist in a particular oxidized manganese material and, therefore, such materials are designated in this specification as MnOx, where x may have values in the range of from 1 to 4 (or to about 4).

In practices of this invention, MnOx is used in combination with one or more other base metal oxides, and such combinations of metal oxides do not, for example, require the presence of platinum (or the large amounts of platinum used in platinum oxidation catalysts) to effectively serve as oxidation catalysts. Preferred examples of such combinations (mixtures) of base metals include binary-metal mixtures such as MnOx—$CeO_2$, MnOx-$Y_2O_3$, and MnOx—$ZrO_2$, and ternary (or more) mixtures of metal oxides such as MnOx—$CeO_2$—$ZrO_2$. The respective metal oxides may be present in equal-molar portions, but this is not required. MnOx is the required constituent, but the proportions of the metals and their oxides may be varied over wide ranges as found suitable to fulfill a specific catalyst requirement. For example, the molar proportions of manganese to the other base metal(s) in the mixture of base metal oxides may be varied, depending on an oxidation catalyst application, from about five mole percent manganese to about ninety mole percent manganese.

One or more oxides of base-metals other than cerium, yttrium, or zirconium may be combined with MnOx in embodiments of this invention. Collectively suitable metal oxides include (in addition to manganese oxides), for example, the oxides of transition metals (Group VIII of the Periodic Table): iron, cobalt, and nickel; Group IIIB metals and rare earth metals: yttrium, lanthanum, cerium, and praseodymium; Group IVB metals: titanium and zirconium; Group VB metals: vanadium and niobium; Group VIB metals: chromium, molybdenum, and tungsten; Group IB metals: copper; and Group IIB metals: such as zinc.

Such metal oxide mixtures, including MnOx, may be prepared as simple mixtures of metal oxides (such as by ball milling a mixture of the metal oxides) and used, for example, as a contained volume of fine particles, or as small compacted pellets, or as deposited particles in a washcoat material deposited on a supporting surface for contact with the flowing gas stream with constituents to be oxidized. The supporting surface or substrate may, for example, be the many thin walls of the through-channels formed in an extruded honeycomb-shaped monolith of ceramic material, or suitable substrate surfaces of a metal oxidation reaction chamber or vessel. In other embodiments of the invention, soluble compounds of manganese and companion base metals may be co-precipitated or co-deposited from a suitable solvent (by evaporation and drying, such as nitrate compounds in water or water with ammonia), and the mixed product calcined, or otherwise oxidized, to form a more intimate mixture of the manganese and companion metal(s) oxides. This intimate mixture of base metal oxides may be prepared in a suitable catalyst material form for placement in a reaction location or container for conduct of the oxidation reactions.

Depending on the particular oxidation reaction requirements, the mixed oxides may be combined with supported palladium particles (or used in combination with Pd particles), or even with supported platinum particles for promoting oxidation reactions at lower temperatures and/or to higher levels of completion of reaction. However, in many embodiments of the invention, the mixed oxides will not require the presence of platinum in the oxidation of nitrogen oxide, carbon monoxide, and hydrocarbons.

In preferred embodiments of the invention, the metal oxide mixtures are used as diesel exhaust oxidation catalysts, optionally with palladium, to prepare a diesel exhaust stream, or other lean-burn engine exhaust stream for the selective catalytic reduction of residual NOx in the exhaust. The effectiveness of a specific catalyst mixture in oxidizing an oxidizable constituent is typically a function of the temperature to which the catalyst has been heated in a hot exhaust stream (or otherwise heated). The temperature of an engine exhaust is typically a function of how long the engine has been operating and the rate at which fuel is being consumed in the engine (i.e., how heavily the engine is loaded). In general, a base metal oxide catalyst of this invention will be selected to serve over an anticipated expected operating temperature range of an exhaust gas or other gas mixture.

In a more general embodiment of the invention, the MnOx-containing, base metal oxide mixture may be used for oxidation of NO in a gas mixture containing NOx and oxygen (and often water).

Other objects and advantages of the invention will be apparent from a further description of preferred (but non-limiting) embodiments of the invention.

DESCRIPTION OF PREFERRED EMBODIMENTS

The term "platinum group metals" (PGM) refers, collectively, to six metallic elements clustered together in the periodic table. They are transition metals and include ruthenium, rhodium, palladium, osmium, iridium, and platinum. These PGM metals have many uses including applications as catalysts for many different chemical reactions. Some of these metals, mainly platinum, or combinations of platinum and palladium, are being used as very small metal particles carried on larger alumina support particles in diesel exhaust oxidation catalysts (DOC) to promote oxidation of NO to $NO_2$ in the oxygen, water, and nitrogen-containing hot gas stream. This oxidation reaction in the oxygen-containing diesel exhaust stream is an important step in preparation of the exhaust for the downstream selective catalytic reduction of $NO_2$ to nitrogen and water in the exhaust system before the exhaust is discharged from the vehicle. But the use of platinum as a diesel oxidation catalyst is very expensive and not especially effective. This invention provides the use of small-particle mixtures of MnOx with other suitable base metal oxides (such as those summarized above) as very effective, and lower cost catalysts for diesel oxidation reactions and other oxidation reactions in oxygen-rich gas streams containing one or more of nitrogen oxides (especially NO), carbon monoxide, and lower hydrocarbons such as residual, incompletely oxidized hydrocarbons from the combustion of diesel fuel or of gasoline in a lean burn spark ignition engine.

Figure 1:
FIG. 1 is a schematic flow diagram illustrating the path of an exhaust gas stream from the exhaust manifold of a diesel engine, or lean-burn gasoline engine, through exhaust conduit sections to an oxidation reactor for the oxidation of NO, HC and CO, and then to a reactor for the selective catalytic reduction of $NO_2$ before the treated exhaust is discharged to the ambient atmosphere.

The oxidation of such constituents in the exhaust of a diesel engine or other lean-burn engine is an important embodiment of practices of this invention. FIG. 1 is a schematic illustration of the flow of hot exhaust gas from a diesel engine (block 10) through exhaust conduit 12 to a catalyzed diesel oxidation reactor (block 14). After the oxidized exhaust has left oxidation reactor 14 it is usually carried through conduit 16 to a downstream catalyzed reduction reactor 18. There may be other exhaust treatment components (not indicated in FIG. 1) in the flow passage of the exhaust such as a diesel particulate trap, a resonator, a muffler, and the like. Such components, and others, are used in treatment of vehicle exhausts but are not directly involved in the catalyzed oxidation practices of this invention. Accordingly, the exhaust gas flow path illustration of FIG. 1 is completed with the gas flowing through tail-pipe conduit 20 from which the treated exhaust is discharged from the vehicle to the ambient atmosphere.

The diesel engine indicated in block 10 may have 2, 3, 4, 5, 6, or more cylinders in a cast engine cylinder block in which the cylinders may be arranged "in-line" or in a "V" arrangement. The engine may also have an intake manifold system for the introduction of fuel and air into the combustion cylinders, and an exhaust system in which combustion gases from the cylinders are combined and directed from the engine to the exhaust system of the vehicle. A fuel comprising compression-ignitable diesel hydrocarbons and air are injected or otherwise delivered (typically in a predetermined sequence), under management of an engine computer control module, into the cylinders of the engine. The mass ratio of air-to-fuel in the mixture is typically at a value of 17/1 or greater, much leaner with respect to fuel content than a stoichiometric air-to-fuel ration of about 14.7. The air and fuel mixture is compressed, heated, and thereby ignited to power the reciprocating pistons in the cylinders of the engine. The spent combustion products are expelled from the respective cylinders by the exhaust strokes of the pistons and into an exhaust manifold. The gas combustion products are pumped by piston action from the exhaust manifold (of engine 10) as exhaust gas into exhaust conduit 12 (often a high temperature-resistant and oxidation-resistant steel alloy) and then to the oxidation reactor illustrated by block 14.

The temperature and composition of the exhaust gas entering the diesel exhaust oxidation reactor (or lean-burn exhaust gas oxidation reactor) 14 are generally as described above in the second paragraph of this specification.

By way of illustration, a suitable oxidation reactor for the oxidation of a diesel or lean-burn exhaust comprises an alloy steel container shaped with an upstream opening (for exhaust flow entry) and a downstream opening for exhaust gas through-flow. The body of the container is often round or elliptical in cross-section and sized to hold a flow-through catalyst-bearing support body for promoting oxidation of the flowing exhaust gas stream. A body formed of a ceramic material such as cordierite or silicon carbide may be used. The ceramic body is often extruded in a honeycomb shape with flat end faces, transverse to exhaust flow, and with many small, square, longitudinal channels extending longitudinally from the upstream face to the downstream face (e.g., 400 channels per square inch of the faces of the extruded body and with typical wall thicknesses of about 4 mils) of this monolithic catalyst support body. The surfaces of the walls of the flow channels of the support body are coated with small particles of base metal oxide oxidation catalyst materials of this invention (sometimes called a "washcoat"). Since each channel is small in cross-section for admitting gas flow, the inlet face of the monolith is sized to provide a suitable number of channels to collectively accommodate a desired flow rate for the exhaust stream or other gas stream. While the extruded ceramic honeycomb-shaped monoliths have proven effective and durable for diesel exhaust oxidation reactors, other catalyst support bodies and other formed catalyst shapes may be used.

There are other types of hydrocarbon-fueled combustion devices from which hot gases are emitted and which contain NO, or NO with CO and incompletely burned HC, and with oxygen, water, and nitrogen. Such devices comprise elements for combining fuel and air, for facilitating their reaction (combustion), and for conducting by-product gases from the combustion site. The base metal oxide catalysts of this disclosure may also be advantageously used, for example, in exhaust passage(s) from such devices for the oxidation of NO to $NO_2$ and, optionally, the oxidation of CO and HC.

A number of mixtures of MnOx particles and other base metal oxide particles have been prepared and used to promote oxidation of NO, CO, and $C_3$ hydrocarbons in a synthetic gas mixture prepared to simulate diesel engine and lean burn engine exhaust. In a first group of experiments, a gas mixture was prepared to contain, by volume, 200 ppm NO, 10% $O_2$, 500 ppm HC($C_3H_8/C_3H_6$ in a 1/2 molar ratio), 3000 ppm CO, 10% $CO_2$, 10% $H_2O$, and the balance nitrogen. High purity commercial sources of these constituents were used. These simulated exhaust gas mixtures were flowed through a volume of catalyst particles contained as washcoat layers on the walls of passages of a monolith in a tubular flow-through reactor at a space velocity of 25,000 $h^{-1}$. In these and following experiments, the value of space velocity refers to the ratio of the volumetric flow rate of the gas mixture (at STP) with respect to the nominal volume of the ceramic monolith (having 400 channels per square inch of inlet face area) arbitrarily based on its outer cross-sectional area and length.

In the this group of experiments, oxidation reaction tests were conducted at temperatures of 200° C., 250° C., 300° C., 350° C., 400° C., and 450° C. by electrical resistance heating of the tubular reactor and its catalyst material.

A mixture of equal parts of small particles of MnOx and $CeO_2$ was prepared by a co-precipitation, drying, and calcining method, and washcoated onto extruded honeycomb ceramic substrates with 400 square openings (4 mil walls thicknesses) for flow-through passages from the upstream face to the downstream face of the monolith. The size of the deposited mixed oxide particles was about 10 to 20 nanometers. This catalyst mixture contained no platinum group metal. These mixed oxides were then aged in air with 10% by volume of water at 700° C. for 24 hours. A section of the mixed base metal oxide-washcoated monolith was placed in the tubular reactor so that the flow of gas was directed through the passages of the ceramic monolith.

Figure 2:
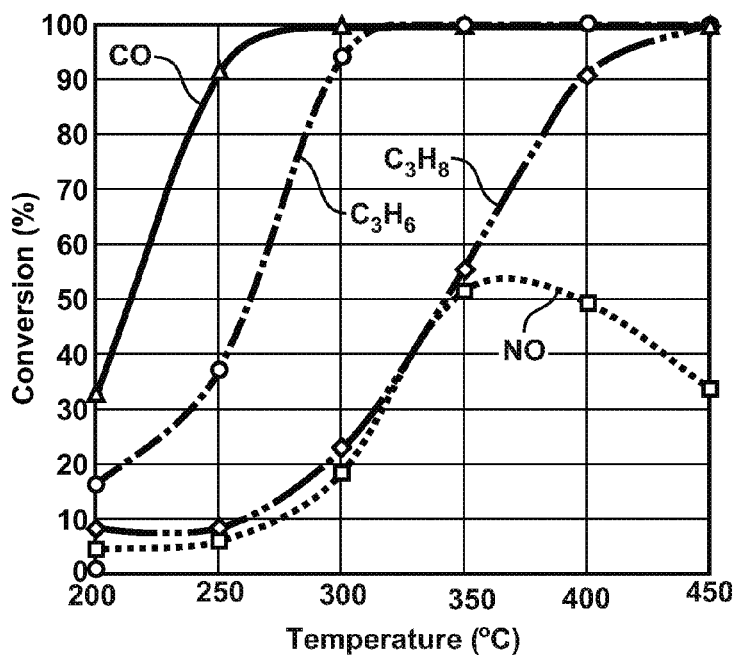
FIG. 2 is a graph of Conversion (%) vs. Temperature (° C.) for the oxidation of carbon monoxide (CO), propylene ($C_3H_6$), propane ($C_3H_8$), and nitrogen oxide (NO) in a synthetic oxygen-rich diesel exhaust stream using particles of MnOx—$CeO_2$ catalyst deposited as a washcoat on the walls of channels of an extruded honeycomb-shaped, flow-through monolithic support.

The reactor was initially heated to 200° C. and the simulated oxygen-containing gas mixture passed through the passages of the monolith with their wash-coatings of mixed metal oxide catalyst particles for a period of time to determine the performance of the candidate oxidation catalyst at the reactor temperature. In this and the following experiments, the gas mixture leaving the tube was collected and analyzed using a Fourier Transform Infrared Analyzer (FTIR). The values of conversion percentages, at 200° C., were for NO (dotted line, square data points), 5%, for $C_3H_8$ (dash, dot, dot line, diamond), 9%, for $C_3H_6$ (dash, dot line, circle), 17%, and for CO (solid line, triangle), 32%, as shown in the graph of FIG. 2. These conversion values were based on the remaining amounts of the respective constituents detected in the exhaust gas leaving the reactor. The conversion values are relatively low at this relatively low gas temperature.

These experiments with the same simulated exhaust composition and the same catalyst material were repeated at temperatures of 250° C., 300° C., 350° C., 400° C., and 450° C. The respective values of conversion percentage for each constituent at each temperature are presented in FIG. 2. It is seen that 90% of the CO was oxidized with the MnOx—$CeO_2$ catalyst mixture at a catalyst and exhaust gas temperature of about 250° C. Ninety percent of the propylene was oxidized at a temperature below about 300° C. Ninety percent of the propane was oxidized at a temperature of 400° C. A maximum conversion of NO (oxidation to $NO_2$) of about 60$^{+}$% occurred at temperatures in the range of about 350° C. to about 400° C.

Another series of oxidation reactions was conducted for purposes of comparing the above oxidation test results for the MnOx—$CeO_2$ mixed oxides with oxidation results for a commercial platinum based catalyst. This commercial catalyst consisted of platinum nanoparticles deposited on alumina support particles. A wash coat of the platinum catalyst was applied to the channel walls of an extruded ceramic honeycomb-shaped monolith (400 channels/$in^2$ of inlet face area). The platinum catalyst material was applied at a loading of about seventy grams of platinum per cubic foot of the superficial, outer-surface volume of a honeycomb shaped monolithic substrate. The platinum-carrying monolith was placed in a heated tubular reactor as described above in this specification. A simulated gas mixture of the same composition as described above was prepared. It contained, by volume, 200 ppm NO, 10% $O_2$, 500 ppm HC (in proportion of one mole of propane, $C_3H_8$ and two moles of propylene, $C_3H_6$), 3000 ppm CO, 10% CO$_2$, 10% H$_2$O, and the balance nitrogen. These simulated exhaust gas mixtures were flowed over the platinum catalyst washcoat at a space velocity of 25,000 h$^{-1}$. Again, in the group of experiments, oxidation reaction tests were conducted at temperatures of 200° C., 250° C., 300° C., 350° C., 400° C., and 450° C. by electrical resistance heating of the tubular reactor and its commercial platinum catalyst material.

Figure 3:
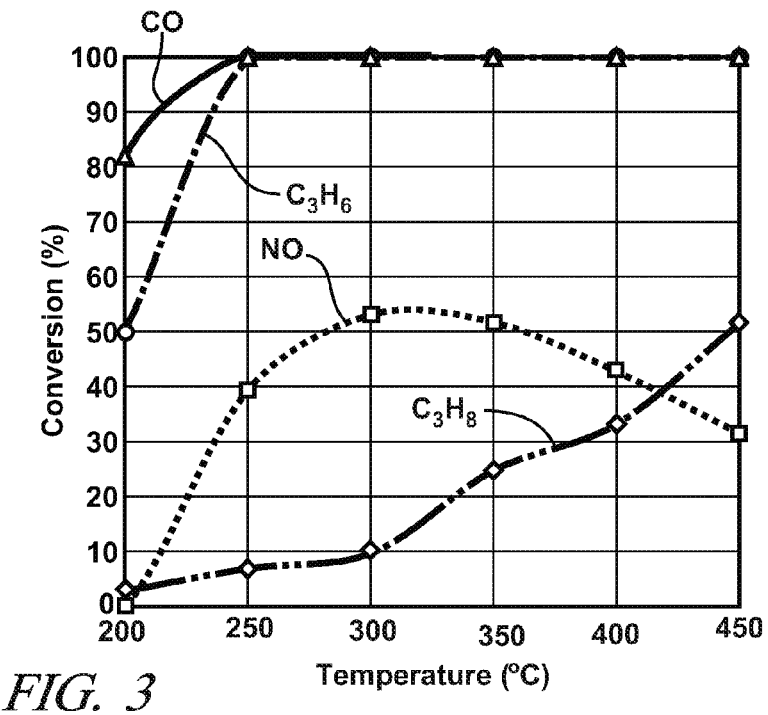
FIG. 3 is a graph of Conversion (%) vs. Temperature (° C.) for the oxidation of carbon monoxide (CO), propylene ($C_3H_6$), propane ($C_3H_8$), and nitrogen oxide (NO) in a synthetic oxygen-rich diesel exhaust stream using a platinum-based commercial honeycomb flow-through monolithic catalyst in which platinum particles were supported on larger alumina particles and deposited as a washcoat on the channel walls of an extruded flow-through monolithic support.

The respective values of conversion percentage for each constituent at each temperature using the commercial platinum catalyst are presented in FIG. 3. It is seen that 90% of the CO (solid data line) was oxidized with the commercial platinum catalyst at a catalyst and exhaust gas temperature of about 220° C. Ninety percent of the propylene (dash, dot line) was oxidized at a temperature of about 235° C. Only about fifty percent of the propane (dash, dot, dot line) was oxidized at a temperature of 450° C. A maximum conversion of NO (dotted line, oxidation to NO$_2$) of about 54% occurred at temperatures in the range of about 300° to about 350° C.

While the commercial platinum catalyst was very effective in catalyzing the oxidation of carbon monoxide and propylene at low exhaust gas temperatures, it was much less effective in the oxidation of propane. The very expensive platinum catalyst achieved only about the same conversions of NO at a slightly lower exhaust gas temperatures.

As illustrated in the conversion data of FIG. 2, a base metal oxide catalyst mixture of equal parts of MnOx and CeO$_2$ was very effective in the oxidation of carbon monoxide and C$_3$ hydrocarbons (saturated and unsaturated) at exhaust gas temperatures in a synthetic exhaust material. The mixture of these base metal oxides also displayed impressive effectiveness in oxidizing NO to NO$_2$ at exhaust gas temperatures.

An additional series of experiments was conducted with base metal oxides on the oxidation of NO to NO$_2$ in a gas mixture consisting of, by volume, 200 ppm NO, 10% oxygen, 10% water, and the balance nitrogen. An electrical resistance heated, flow-through tubular reactor was used as described above in this specification. A group of mixed base metal oxide catalysts were prepared consisting of equal molar parts of MnOx—CeO$_2$, equal molar parts of MnOx—ZrO$_2$, and equal molar parts of MnOx-Y$_2$O$_3$. For purposes of comparison, a MnOx (only) catalyst was prepared and a commercial platinum catalyst was obtained. Each catalyst was aged at 700° C. in 10% H$_2$O/air for 24 hours. These five catalyst materials were used separately in a series of oxidation experiments with the gas mixture described in this paragraph. Each catalyst material was deposited as washcoat particles on the walls of an extruded ceramic honeycomb monolith. The oxidation tests were conducted at temperatures of 200° C., 250° C., 300° C., 350° C., and 400° C. and the space velocity of the gas flow was controlled to be 25,000 h$^{-1}$.

Figure 4:
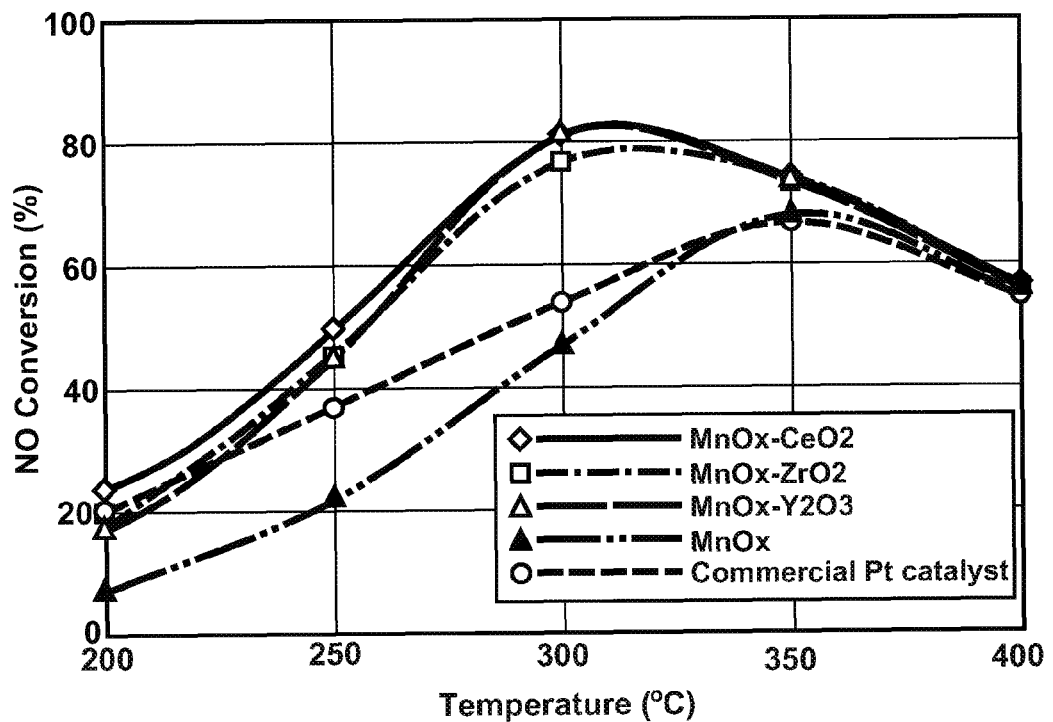
FIG. 4 is a graph of NO Conversion (%) vs. Temperature (° C.) for the oxidation of NO to $NO_2$ in a synthetic oxygen and water containing gas stream using, individually, three different mixed base metal catalysts: MnOx—$CeO_2$, MnOx—$ZrO_2$, and MnOx-$Y_2O_3$; and for comparison: MnOx alone, and a commercial platinum monolithic catalyst as described with respect to FIG. 3. In each test, particles of the catalyst material were deposited as a washcoat on the channel walls of an extruded honeycomb flow-through monolithic support.

FIG. 4 presents the data in terms of percent conversion of NO in the water and oxygen-rich gas stream by the respective catalysts. It is seen that the maximum NO percent conversion values for MnOx—CeO$_2$ (solid line, diamond data points) and MnOx-Y$_2$O$_3$ (long dashed line, unfilled triangle data points) are very comparable and exceed 80% conversion at temperatures just over 300° C. It is also seen that the maximum NO percent conversion values for MnOx—ZrO$_2$ (dash, dot lines, unfilled square) reach nearly 80% at about the same temperature range. The NO percent conversions values for MnOx alone (short dash lines, filled triangle data points) and for the commercial platinum catalyst (short dash lines, unfilled circles) are significantly lower than for the three base metal oxide mixtures, each containing MnOx.

In another group of experiments, a combination of a commercial palladium catalyst and a mixture of base metal oxides were used to oxidize carbon monoxide, nitrogen oxide, propane, and propylene in a flowing stream of a synthetic gas mixture. The commercial palladium catalyst was obtained and used as alumina-supported palladium particles applied as a washcoat to the channels of an extruded flow-through ceramic monolith Particles of MnOx—ZrO$_2$ (equal molar portions of the base metal oxides) were prepared and applied as a washcoat to the channels of a second and like extruded ceramic honeycomb monolith. The quantities of palladium and mixed base metal oxides were used in equal volumes in their respective monolith supports. Each catalyst was aged at 700° C. in 10% water/air for 24 hours prior to testing. The palladium-containing monolith was placed immediately upstream of the base metal oxides-containing monolith in a resistance heated tubular reactor as described above in this specification. The cost of palladium in such a catalyst is about $17/liter.

For purposes of comparison with the palladium and base metal oxide catalyst system, a commercial catalyst for oxidation of diesel exhaust was obtained, consisting, by weight, of seven parts platinum and one part palladium. The cost of platinum plus palladium in this commercial catalyst is about $72/liter. The commercial platinum and palladium catalyst was obtained and used as nanoparticles of the noble metals dispersed on alumina carrier particles and applied as a washcoat to the channels of an extruded ceramic honeycomb monolith body. The platinum and palladium catalyst was also aged at 700° C. in 10% water/air for 24 hours prior to testing. Generally equivalent weights of the active catalyst materials were used in the comparative testing.

A synthetic gas mixture consisting of, by volume, 200 ppm NO, 10% oxygen, 500 ppm HC(C$_3$H$_6$/C$_3$H$_8$=1/2, molar ratio), 3000 ppm CO, 10% CO$_2$, 10% H$_2$O, and the balance nitrogen was used in the oxidation tests. Again, the catalyst material-washcoated monoliths were placed in the center of a resistance heated tubular reactor. The synthetic gas stream was flowed through the washcoated monoliths at a space velocity of 25,000 h$^{-1}$. As in like oxidation tests described above, the oxidation tests were conducted sequentially at temperatures of 200° C., 250° C., 300° C., 350° C., 400° C., and 450° C. by electrical resistance heating of the tubular reactor and its respective catalyst materials.

Figure 5:
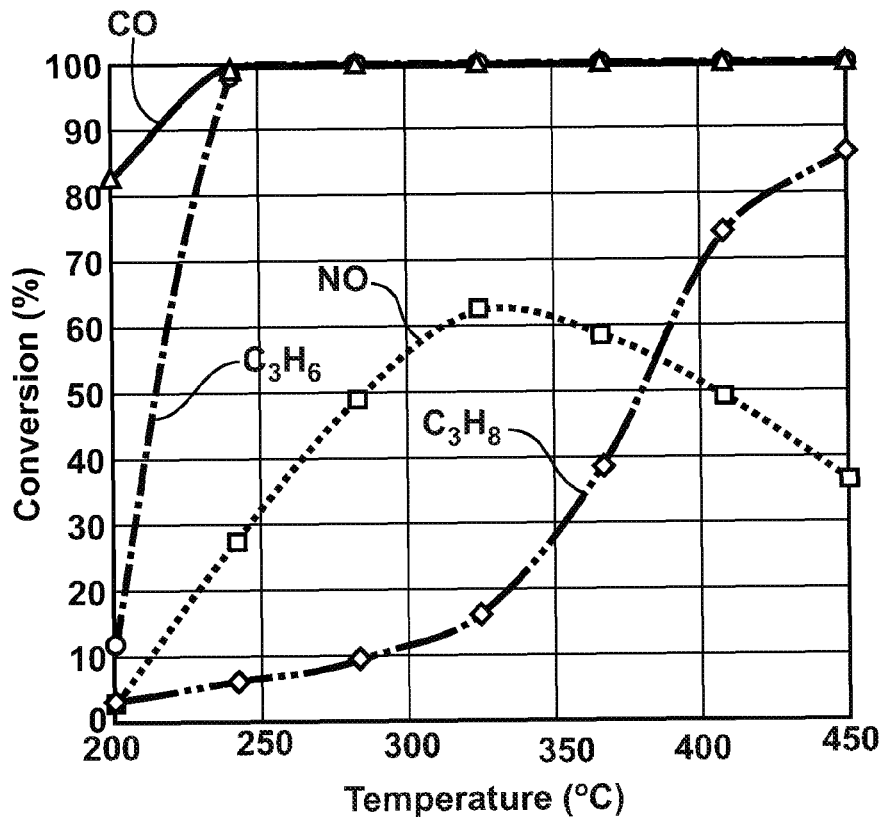
FIG. 5 is a graph of NO Conversion (%) vs. Temperature (° C.) for the oxidation of carbon monoxide (CO), propylene ($C_3H_6$), propane ($C_3H_8$), and nitrogen oxide (NO) in a synthetic oxygen-rich diesel exhaust stream using an upstream extruded honeycomb flow-through monolith body in which the channel walls carried a washcoat of alumina-supported palladium particles and an immediately downstream extruded monolithic support in which the channel walls carried a washcoat of MnOx—$ZrO_2$ (equal molar parts) particles. The two monoliths carried equal parts of their respective catalyst per the superficial volume (the volume of the outline shape of the monolith) of the monolith body.
Figure 6:
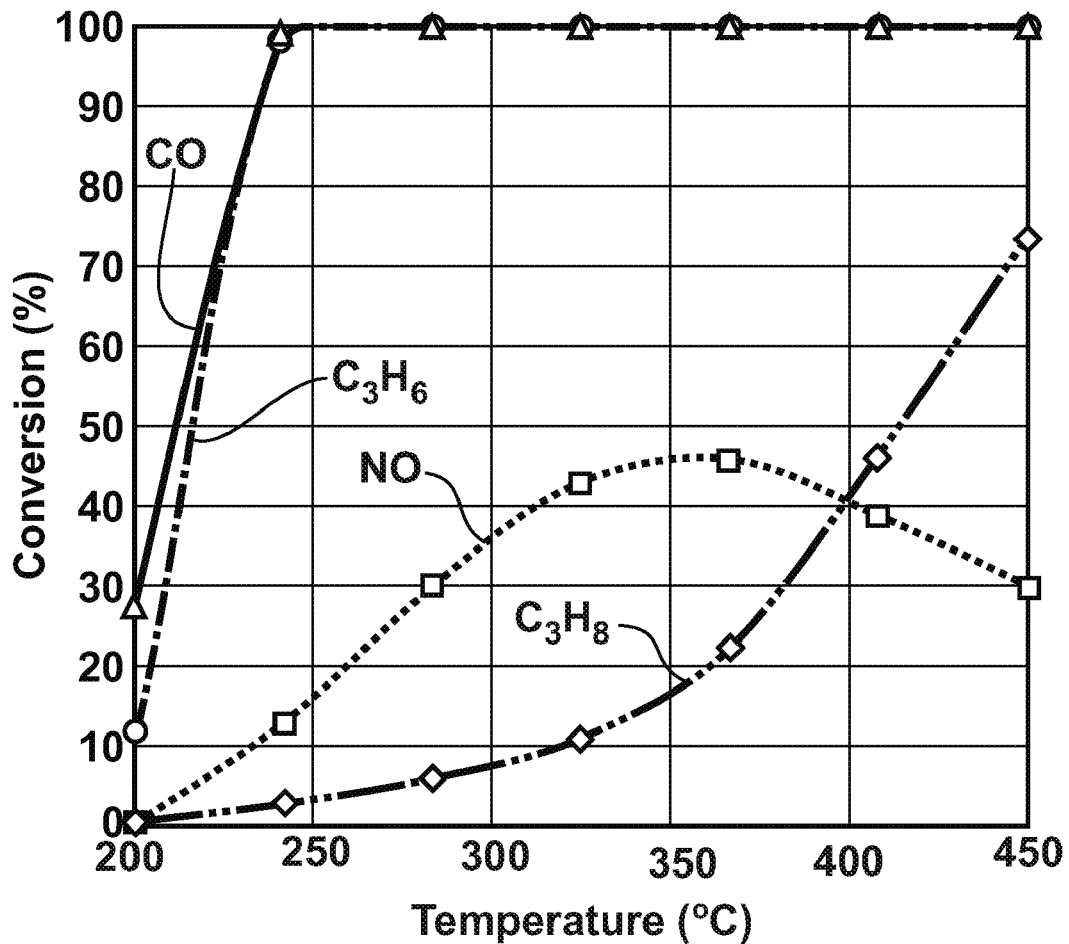
FIG. 6 is a graph of NO Conversion (%) vs. Temperature (° C.) for the oxidation of carbon monoxide (CO), propylene ($C_3H_6$), propane ($C_3H_8$), and nitrogen oxide (NO) in a synthetic oxygen-rich diesel exhaust stream using a commercial honeycomb-shaped, flow-through, monolithic, diesel oxidation catalyst composed of platinum and palladium (Pt/Pd=7/1). Particles of platinum/palladium were carried on larger alumina support particles and were deposited as a washcoat on the walls of the many channels of the extruded monolithic support.

The percent conversions (%) of the four oxidizable constituents of the gas mixtures over the respective catalysts at the temperatures of the oxidation experiments are presented in graphical format in FIGS. 5 and 6. In FIG. 5 it is seen that the MnOx—ZrO$_2$ and palladium catalyst combination provides substantially equivalent effectiveness with the platinum-palladium catalyst (FIG. 6) for the oxidation of CO and C$_3$H$_6$ in the heated synthetic exhaust. Moreover, the data of FIGS. 5 and 6 demonstrate that the much less expensive base metal oxide mixture with palladium was more effective in oxidation of nitrogen oxide (NO) and propane (C$_3$H$_8$) than the commercial platinum-palladium catalyst.

It is found that the effectiveness of mixtures of MnOx-containing base metal oxides with palladium is quite surprising because in actual tests of a palladium catalyst in oxidation of the same synthetic gas mixtures (as used in the FIG. 5 experiments), palladium alone is not an effective catalyst for the oxidation of either nitrogen oxide or propane.

Accordingly, it is found that mixtures of MnOx with other base metal oxides may be used effectively in the oxidation of one or more of nitrogen oxide, carbon monoxide, and low molecular weight hydrocarbons in oxygen-containing (and water containing) gas mixtures. Also, such suitably formulated and prepared mixtures of base metal oxides may be effectively combined with suitable amounts of palladium, or even platinum (if the cost is justified), in promoting such oxidation reactions. Such oxidation reactions are typically conducted at temperatures in the range of about 150° C. to about 450° C. and at volumetric gas flow rates experienced in the flow of lean burn engine exhaust systems or the like.

In some embodiments of the invention it is desired to use a combination of base metal oxide catalyst materials and palladium and/or platinum catalyst materials. The combination may be used in the form of mixtures of, for example, particles of base metal oxides and particles of supported platinum group metal. In many of these situations it may be preferred to apply the catalyst particles as a washcoat on the flow through channels of a suitably sized and shaped, extruded ceramic monolith. Such a structure provides a very large number of small channels per unit area of its inlet and outlet faces, and the walls of each of the many channels may be coated (washcoated) with a thin layer of particles of the catalysts. The gas stream with its oxidizable constituents is then directed in many separate streams (as it encounters the inlet face of the monolith) and through the channels and into intimate contact (through and over the particles) with the catalyst material. In such catalyst support structures, the volume of the washcoated channels may not be easily determined. So, sometimes the superficial or external outline volume of the extruded body is used to characterize a loading of catalyst on the monolith. In these embodiments in which the catalyst is carried as particles on the walls of many channels, it is convenient and common to characterize the loading of the catalyst particles in terms of grams of a catalyst material of interest per unit of the superficial volume of the monolith body.

Accordingly, when base metal oxide catalyst materials of this invention are combined with palladium, it is generally suitable for the palladium to be loaded on support particles (e.g., alumina particles) in amounts up to about two hundred grams of palladium per cubic foot of superficial monolith volume. And when base metal oxide catalyst materials of this invention are combined with platinum, it is generally suitable for the platinum to be loaded on support particles (e.g., alumina particles) in amounts up to about one hundred grams of platinum per cubic foot of superficial monolith volume.

Embodiments of practices of the invention have been presented to illustrate the invention and not to limit its scope. For example, and as stated in this specification, mixed base metal oxide catalysts of this invention have general utility in the oxidation of NO in gas mixtures containing oxygen, nitrogen, and water. In general, they may be used in particulate form and deposited on surfaces of a ceramic monolith, a metallic substrate, or other suitable substrate.

The invention claimed is:

1. A method of oxidizing nitrogen oxide (NO) to nitrogen dioxide in a gas also containing oxygen, nitrogen, and water, the gas being at a temperature above about 200° C.; the method comprising:

passing a stream of the nitrogen oxide-containing gas in contact with solid catalyst particles comprising a mixture of MnOx and at least one other base metal oxide selected from the group consisting of cerium oxide ($CeO_2$), yttrium oxide ($Y_2O_3$), and zirconium oxide ($ZrO_2$), where x has a value of from 1 to 4, the MnOx content is five to ninety mole percent of the mixture of metal oxides, and the at least one other metal oxide makes up the balance of the mixture of metal oxides, the nitrogen oxide-containing gas being in contact with the catalyst particles for a time suitable for oxidizing at least a portion of the NO to $NO_2$.

2. A method of oxidizing as recited in claim 1 in which the stream of nitrogen oxide-containing gas is also passed in contact with particles of at least one of palladium and platinum, supported as an oxidation catalyst.

3. A method of oxidizing as recited in claim 1 in which the solid catalyst particles comprise a mixture of MnOx and at least one of $CeO_2$, $Y_2O_3$, and $ZrO_2$, and the MnOx content is twenty five to fifty mole percent of the mixture of metal oxides.

4. A method of oxidizing as recited in claim 1 in which the mixture of metal oxides is formed by co-precipitation of compounds of manganese and the metal or metals of the other metal oxide or metal oxides from a solvent and calcining of the co-precipitated compounds to form the mixture of metal oxides.

5. A method of oxidizing as recited in claim 4 in which the mixture of MnOx and the at least one other base metal oxide consists of generally equal molar portions of MnOx and the one or more other metal oxide.

6. A method of oxidizing as recited in claim 1 in which the mixture of MnOx and the at least one other base metal oxide consists of generally equal molar portions of MnOx and the one or more other metal oxide.

7. A method of oxidizing nitrogen oxide (NO), carbon monoxide, and lower molecular weight hydrocarbons in a gas stream also containing oxygen, water, and nitrogen, the gas being at a temperature in the range of about 200° C. to about 500° C., the method comprising:

passing the gas stream over or through solid catalyst particles comprising a mixture of MnOx and at least one other metal oxide, selected from the group consisting of cerium oxide ($CeO_2$), yttrium oxide ($Y_2O_3$), and zirconium oxide ($ZrO_2$) where x has a value of from 1 to 4, the MnOx content is five to ninety mole percent of the mixture of metal oxides, and the at least one other metal oxide makes up the balance of the mixture of metal oxides, the gas stream being in contact with the catalyst particles for a time suitable for oxidizing at least a portion of the NO to $NO_2$, at least a portion of the carbon monoxide to carbon dioxide, and at least a portion of the hydrocarbons to carbon dioxide and water.

8. A method of oxidizing as recited in claim 7 in which the gas stream is also passed over or through particles of at least one of palladium and platinum, supported for oxidation of NO in the gas stream.

9. A method of oxidizing as recited in claim 7 in which the solid catalyst particles comprise a mixture of MnOx and at least one of $CeO_2$, $Y_2O_3$, and $ZrO_2$, and the MnOx content is twenty five to fifty mole percent of the mixture of metal oxides.

10. A method of oxidizing as recited in claim 7 in which the low molecular weight hydrocarbons comprise aliphatic hydrocarbons in the range of $C_1$ through $C_5$ hydrocarbons and saturated or ethylenically unsaturated hydrocarbons.

11. A method of oxidizing as recited in claim 7 in which the mixture of metal oxides is formed by co-precipitation of compounds of manganese and the metal or metals of the other metal oxide or metal oxides from a solvent and calcining of the co-precipitated compounds to form the mixture of metal oxides.

12. A method of oxidizing as recited in claim 11 in which the mixture of MnOx and the at least one other base metal oxide consists of generally equal molar portions of MnOx and the one or more other metal oxide.

13. A method of oxidizing as recited in claim 7 in which the mixture of MnOx and the at least one other base metal oxide consists of generally equal molar portions of MnOx and the one or more other metal oxide.

14. A method of oxidizing nitrogen oxide (NO), carbon monoxide, and lower molecular weight hydrocarbons in the exhaust gas from a lean-burn engine and also containing oxygen, water, and nitrogen, the gas being at a temperature in the range of about 200° C. to about 500° C., the method comprising:

passing the gas stream over or through solid catalyst particles comprising a mixture of $MnO_x$ and at least one other metal oxide, selected from the group consisting of cerium oxide ($CeO_2$), yttrium oxide ($Y_2O_3$), and zirconium oxide ($ZrO_2$) where x has a value of from 1 to 4 the $MnO_x$ content is five to ninety mole percent of the mixture of metal oxides, and the at least one other metal oxide makes up the balance of the mixture of metal oxides, the nitrogen oxide-containing gas being in contact with the catalyst particles for a time suitable for oxidizing at least a portion of the NO to $NO_2$, at least a portion of the carbon monoxide to carbon dioxide, and at least a portion of the hydrocarbons to carbon dioxide and water; and, thereafter subjecting the gas stream to selective catalytic reduction for the reduction of $NO_2$ and any remaining NO.

15. A method of oxidizing as recited in claim 14 in which the stream of nitrogen oxide containing gas is also passed over or through particles of at least one of palladium and platinum, supported for oxidation of NO in the gas stream.

16. A method of oxidizing as recited in claim 14 in which the solid catalyst particles comprise a mixture of $MnO_x$ and at least one of $CeO_2$, $Y_2O_3$, and $ZrO_2$, and the $MnO_x$ content is twenty five to fifty mole percent of the mixture of metal oxides.

17. A method of oxidizing as recited in claim 14 in which the low molecular weight hydrocarbons comprise aliphatic hydrocarbons in the range of $C_1$ through $C_5$ hydrocarbons and saturated or ethylenically unsaturated hydrocarbons.

18. A method of oxidizing as recited in claim 14 in which the mixture of metal oxides is formed by co-precipitation of compounds of manganese and the metal or metals of the other metal oxide or metal oxides from a solvent and calcining of the co-precipitated compounds to form the mixture of metal oxides.

19. A method of oxidizing as recited in claim 18 in which the mixture of $MnO_x$ and the at least one other base metal oxide consists of generally equal molar portions of $MnO_x$ and the one or more other metal oxide.

20. A method of oxidizing as recited in claim 14 in which the mixture of $MnO_x$ and the at least one other base metal oxide consists of generally equal molar portions of $MnO_x$ and the one or more other metal oxide.

\* \* \* \* \*